Patented Aug. 16, 1932

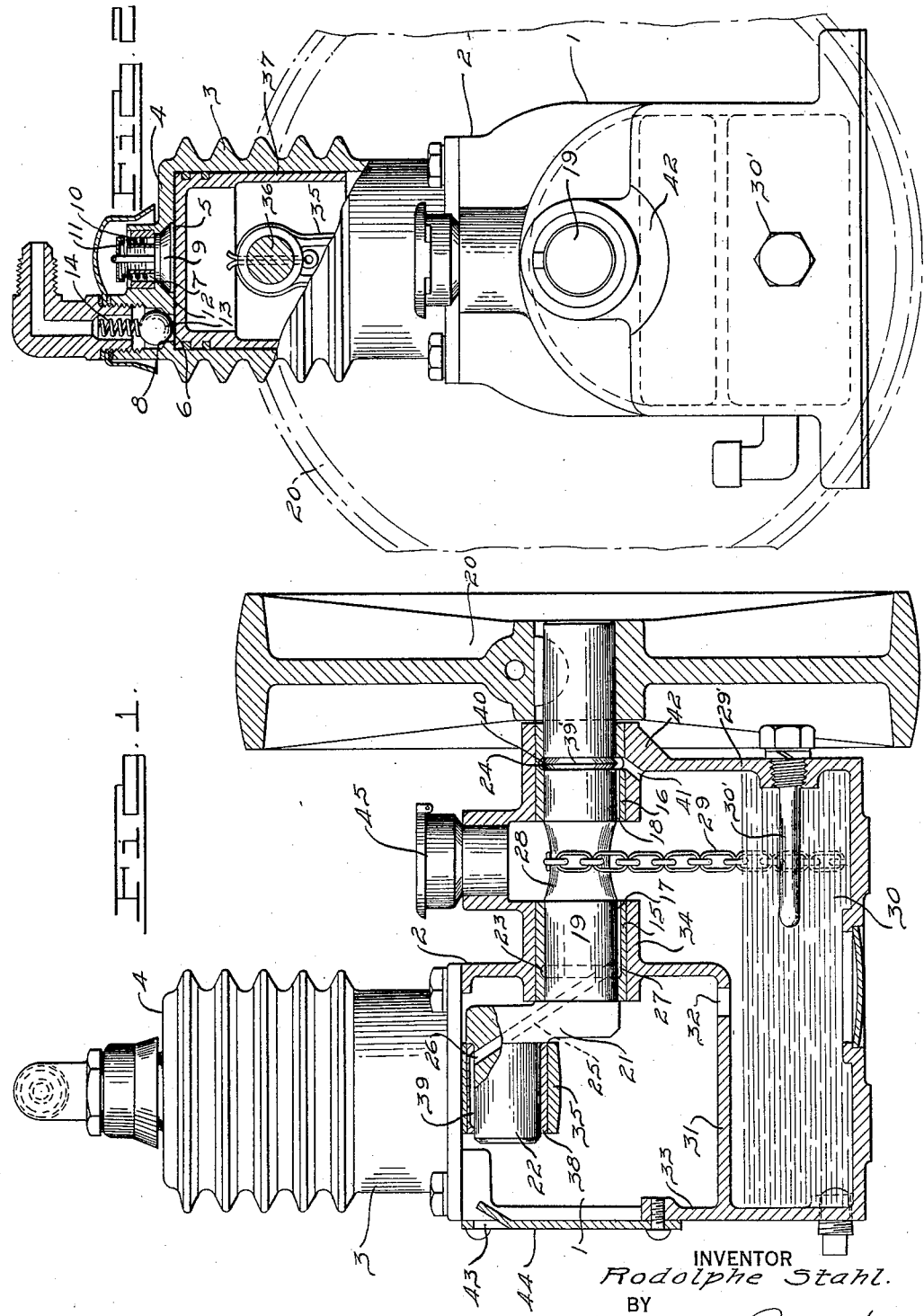

1,871,826

UNITED STATES PATENT OFFICE

RUDOLPHE STAHL, OF DETROIT, MICHIGAN, ASSIGNOR TO SAYLOR-BEALL MANUFACTURING COMPANY, A CORPORATION OF MICHIGAN

COMPRESSOR

Application filed May 1, 1930. Serial No. 448,850.

This invention relates to an improved air compressor, and particularly to the lubricating apparatus thereof.

In air compressors of the type employed in paint spraying devices it is essential to prevent contamination of the air by the lubricant which is used on the bearings and other moving parts. It has been difficult to supply sufficient oil to properly lubricate the moving parts of an air compressor without allowing some of the oil to escape into the compressed air. This is particularly true of compressors of inexpensive types, in which production cost prohibits the use of pump feed pressure lubricating systems.

The main objects of this invention are to provide an inexpensive lubricating device for air compressors, which will properly lubricate the moving parts thereof without introducing oil into the air which is being placed under compression; to provide improved means for supplying lubricant to the bearings of an air compressor by centrifugal force; to provide an improved crank case construction having a lubricant reservoir which is separated from the space into which the crank and crank end of the connecting rod of the compressor extends.

Further objects of my invention are to provide improved means for conveying oil from the reservoir to the crank shaft of the compressor; to provide means of this kind which will supply oil to the crank shaft in quantities increasing with the speed of rotation of the crank shaft; and to provide a lubricant conveyor which does not require the provision of additional crank case space for its accommodation.

An illustrative embodiment of my invention is shown in the accompanying drawing, in which:

Fig. 1 is a longitudinal section of a compressor embodying my invention.

Fig. 2 is an end elevation, partly in section, of the compressor shown in Fig. 1, illustrating parts thereof in sections.

In the form shown, the compressor comprises a crank case 1 having a cylinder block 2 on which a cylinder 3 is mounted. The end wall 4 of the cylinder is provided with an air inlet 5 and an air outlet 6 in which valve seats 7 and 8 respectively are formed. An inlet valve 9 is slidably mounted in the inlet passage 5, and is normally held in a closed position by a spring 10 which bears between a cap 11 and a flange 12, formed in the inlet passage. A ball valve 13 is provided in the outlet passage 6 and is normally urged downwardly and held in a closed position by a spring 14.

The crank case 1 has a pair of spaced bearings 15 and 16 in which axially extending lubricant passages 17 and 18 respectively, are formed, having an open side at the inner periphery thereof. Journaled in the bearings 15 and 16 is a crank shaft 19 having a fly wheel 20 on its outer end, and a crank arm 21 on its inner end on which is formed a crank pin 22. The bearings 15 and 16 have annular grooves 23 and 24 in their inner peripheries which communicate with the passages 17 and 18, respectively.

Extending diagonally through the crank shaft 19, crank arm 21 and crank pin 22, is a lubricant passage 25, which communicates at its inner end with the annular groove 23 of the bearing 15, and which has an outlet 26 at its outer end, located on the periphery of the crank pin 22. The passage 25 extends transversely of the crank shaft from a point on the journaled portion of the shaft to a point on the respectively opposite side of the periphery of the crank pin 22. Thus the passage 25 is asymmetrical with respect to the axis of rotation of the shaft, the outlet 26 of the passage 25 being further from the axis of rotation than the inlet 27 of the passage.

A portion 28 of the shaft 19, which is located between the bearings 15 and 16, is provided with a spool-shaped groove having oppositely inclined sides which converge substantially midway between the two bearings. Mounted on the groove portion 28 of the shaft 19 is an endless chain 29, which depends into an oil reservoir 30 at the bottom of the crank case 1, and serves as a conveyor for feeding oil to the grooved part 28 of the crank shaft. The conveyor 29 is held in a submerged position in the reservoir 30 by a pin 35 which is threaded in the end wall 29' of the crank case, and extends through the loop of the chain. This prevents the chain from becoming tangled when the oil becomes cold and thick.

The lubricant reservoir 30 is separated from the space below the cylinder 6 into which the crank arm 21 and crank pin 22 extend during rotation of the crank shaft, by a partition 31 having a drain vent 32 therein. The partition 31 is supported at one end on the end wall 33 of the crank case and extends upwardly at its other end where it is supported by a tubular member 34 in which the bearing 15 is seated.

Journaled on the crank pin 22 is a connecting rod 35 which is pivotally attached by a wrist pin 36 to a piston 37 located in the cylinder 6. The bearing 38 in which the crank pin 22 is journaled has an oil groove 39 in its inner periphery communicating with the outlet 26 of the lubricant passage 25.

Formed in the shaft 19 in registration with the annular groove 24 of the bearing 16 is an oil throw ring 39' which is seated in an annular groove 40, formed in the shaft 19. A drain port 41 extends through the supporting structure 42 in which the bearing 16 is mounted and commnicates with the grooves 24 and 40 of the bearing 16 and shaft 19 respectively.

In operation, as the shaft 19 rotates the chain 29 is driven, carrying drops or films of oil which form in the links of the chain, from the reservoir 30 to the spool or grooved portion 28 of the shaft. The lubricant is driven outwardly by centrifugal force from the deepest portion of the groove 28 and is fed to the inlet of the axial lubricant passages 17 and 18 of the bearings 15 and 16 respectively by the inclined sides of the groove. The oil enters the annular groove 23 in the bearing 15 and from there passes into the inclined passage 25, from which it is supplied to the groove 38 in the connecting rod bearing 39, and to the periphery of the crank pin 22.

During rotation of the crank shaft, the passage 25 becomes substantially filled with lubricant, and as this passage is asymmetrical with respect to the axis or rotation of the crank shaft, the oil at the outlet 26 is further from the axis of rotation than the oil at the inlet 27. This condition causes the lubricant to be fed by centrifugal force in the direction of the crank pin 22, thereby drawing the lubricant through the passage or groove 17 in the bearing 15. This method of feeding lubricant to the connecting rod bearings provides a sufficient suply of lubricant without delivering an excess of oil and contaminating the air being placed under compression.

The lubricant which is fed to the right as viewed in Fig. 1 from the center of the groove portion 28 of the shaft enters the passage 18 in the bearing 16 and flows to the oil throw ring 39', from which it is discharged through the passage or drain 41 into the lubricant reservoir 30. A vent 43 formed in a plate 44 on the wall 35 of the crank case permits the flow of air therethrough to fed the compressor.

Air, and oil which drips from the crank pin 22, are admitted into the reservoir 30 from the crank case through the opening 32 in the baffle 31. The reservoir 30 may be filled through the oil inlet 45. The opening 32 is preferably placed to one side of the crank case as shown, and in a position remote from the vent 43, so as to be affected as little as possible by the movement of air in the crank case, and difference in level of oil in the reservoir 30 when the device is tipped, and thus prevent oil from being carried into the crank case from the reservoir through the opening 32.

Although but one specific embodiment of my invention is herein shown and described, it will be understood that numerous details of the construction shown may be altered or omitted without departing from the spirit of this invention, as defined by the following claims.

I claim:

1. An air compressor including a crank case having a lubricant reservoir therein, a bearing in said crank case having a groove in its periphery open at one end, means for feeding lubricant only to the open end of said groove, and a crank shaft journaled in said bearing, including a crank arm and a crank pin and having a transverse passage extending further on one side of the axis of said shaft than on the other and communicating with the groove of said bearing, the differential of the centrifugal action upon the lubricant in the portion of said passage on opposite sides of said axis constituting the sole source of pressure for passing lubricant through the groove of said bearing.

2. An air compressor including a crank case having a lubricant reservoir therein, a bearing in said crank case having a groove in its periphery open at one end, a crank shaft journaled in said bearing having a concave grooved portion terminating adjacent the open end of said bearing for feeding lubricant thereto under centrifugal action, and including a crank arm and crank pin having a transverse passage extending further on one side of the axis of said shaft than on the other and open at the periphery of said crank pin and communicating with the groove of said bearing, the differential of the centrifugal action upon the lubricant in the portions of the passage of said crank shaft on opposite sides of the axis thereof constituting the sole source of pressure for forcing lubricant through the groove of said bearing and to the periphery of said crank pin, and an endless conveyor chain on the grooved portion of said crank shaft for feeding lubricant from said reservoir to said grooved portion.

RODOLPHE STAHL.